US012811943B2

(12) United States Patent
Xin et al.

(10) Patent No.: US 12,811,943 B2
(45) Date of Patent: Nov. 24, 2026

(54) CONTAINER NETWORK ACCESS CONTROL METHOD, APPARATUS, MEDIUM, AND DEVICE

(71) Applicant: Beijing Volcano Engine Technology Co., Ltd., Beijing (CN)

(72) Inventors: Wenqiang Xin, Beijing (CN); Lang An, Beijing (CN); Jun Dong, Beijing (CN); Zelong Yue, Beijing (CN); Jian Yang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 88 days.

(21) Appl. No.: 19/056,549

(22) Filed: Feb. 18, 2025

(65) Prior Publication Data

US 2026/0032121 A1 Jan. 29, 2026

(30) Foreign Application Priority Data

Jul. 26, 2024 (CN) ......................... 202411018511.6

(51) Int. Cl.
*H04L 9/40* (2022.01)
*G06F 13/28* (2006.01)
*G06F 15/173* (2006.01)

(52) U.S. Cl.
CPC ............ *H04L 63/101* (2013.01); *G06F 13/28* (2013.01); *G06F 15/17331* (2013.01); *H04L 63/0263* (2013.01)

(58) Field of Classification Search
CPC ..................................................... H04L 63/101
See application file for complete search history.

(56) References Cited

U.S. PATENT DOCUMENTS 11,159,366 B1 10/2021 Gawade et al.
2007/0198714 A1* 8/2007 Faden ................. G06F 21/6236 709/225
2014/0096270 A1* 4/2014 Beckwith ................ G06F 21/62 726/30

(Continued)

FOREIGN PATENT DOCUMENTS

CN 110311948 A 10/2019
CN 113986459 A 1/2022

(Continued)

OTHER PUBLICATIONS

China National Intellectual Property Administration, Office Action Issued in Application No. 202411018511.6, Dec. 12, 2024, 23 pages.

(Continued)

*Primary Examiner* — Bradley W Holder
(74) *Attorney, Agent, or Firm* — Alleman Hall LLP

(57) ABSTRACT

The present disclosure relates to a container network access control method and apparatus, a medium, a device, and a program product. The method includes: determining, by a filter, identity information of a first network endpoint and identity information of a second network endpoint, searching for a target access action corresponding to the identity information of the first network endpoint and the identity information of the second network endpoint based on a network endpoint-level access control list preconfigured for the Pod, and performing the target access action.

20 Claims, 5 Drawing Sheets

(56) References Cited

U.S. PATENT DOCUMENTS

| | | | | |
|---|---|---|---|---|
| 2018/0247064 | A1* | 8/2018 | Aronovich | G06F 16/24552 |
| 2021/0374693 | A1* | 12/2021 | La Salle | G06Q 20/065 |

FOREIGN PATENT DOCUMENTS

| | | | |
|---|---|---|---|
| CN | 114070637 | A | 2/2022 |
| CN | 115801569 | A | 3/2023 |
| CN | 116633775 | A | 8/2023 |
| CN | 117336257 | A | 1/2024 |
| CN | 117951684 | A | 4/2024 |

OTHER PUBLICATIONS

European Patent Office, Extended European Search Report Issued in Application No. 25157467.9, mailed Apr. 8, 2025, Germany, 10 pages.

Hasanth K.M., et al., "Data Processing Unit (DPU) Based Network Process Offloading for Efficient Service Meshes", Proceedings of 2024 IEEE 10th International Conference on Network Softwarization (Netsoft), Jun. 24, 2024, Saint Louis, MO, 3 pages.

Nam J., et al., "Secure Inter-Container Communications Using XDP/eBPF", IEEE /ACM Transactions on Networking, vol. 31, No. 2, Apr. 2, 2023, 14 pages.

China National Intellectual Property Administration, Office Action and Search Report Issued in Application No. 202411018511.6, Apr. 21, 2025, 5 pages.

* cited by examiner

CONTAINER NETWORK ACCESS CONTROL METHOD, APPARATUS, MEDIUM, AND DEVICE

CROSS-REFERENCE TO RELATED APPLICATION

This application claims the priority to and benefits of Chinese Patent Application No. 202411018511.6, filed on Jul. 26, 2024. All the aforementioned patent application is hereby incorporated by reference in its entirety.

TECHNICAL FIELD

The present disclosure relates to the field of computer technologies, and in particular, to a container network access control method, an apparatus, a medium, a device, and a program product.

BACKGROUND

In a cloud network scenario, security isolation of a container network is usually achieved by relying on a security group of a virtual private cloud (VPC). When containers are frequently created and deleted, security group rules need to be frequently operated, which results in a relatively large isolation activation delay. Moreover, because the VPC security group has a quota limitation, the VPC security group cannot be adapted to a large-scale deployment environment. Therefore, a new method needs to be studied to achieve the security isolation of the container network.

SUMMARY

The summary is provided to introduce concepts in a simplified form, and the concepts will be described in detail in the following Detailed Description. The summary is not intended to identify key features or essential features of the claimed technical solutions, nor is it intended to be used to limit the scope of the claimed technical solutions.

The present disclosure provides a container network access control method, including: determining, by a filter, identity information of a first network endpoint and identity information of a second network endpoint, where the first network endpoint and the second network endpoint are related to a container network communication link across a container group (Pod), the Pod is configured with a plurality of network endpoints to support container communication across Pods; searching for, based on a network endpoint-level access control list preconfigured for the Pod, a target access action corresponding to the identity information of the first network endpoint and the identity information of the second network endpoint, where the network endpoint-level access control list is used to maintain an access action for network ingress and egress between network endpoints across Pod, and the access action includes allowing access or denying access; and performing the target access action.

The present disclosure provides a container network access control apparatus, including: an acquisition module configured to determine, by a filter, identity information of a first network endpoint and identity information of a second network endpoint, where the first network endpoint and the second network endpoint are related to a container network communication link across a container group (Pod), the Pod is configured with a plurality of network endpoints to support container communication across Pods; a search module configured to search for, based on a network endpoint-level access control list preconfigured for the Pod, a target access action corresponding to the identity information of the first network endpoint and the identity information of the second network endpoint, where the network endpoint-level access control list is used to maintain an access action for network ingress and egress between network endpoints across Pods, and the access action includes allowing access or denying access; and an execution module configured to perform the target access action.

The present disclosure provides a non-transitory computer-readable medium having a computer program stored thereon, and when the computer program is executed by a processing apparatus, the steps of the method according to any embodiment of the present disclosure are implemented.

The present disclosure provides an electronic device, including: a storage apparatus having a computer program stored thereon; and a processing apparatus configured to execute the computer program in the storage apparatus to implement the steps of the method according to any embodiment of the present disclosure.

The present disclosure provides a computer program product including a computer program, and when the computer program is executed by a processor, the steps of the method according to any embodiment of the present disclosure are implemented.

Other features and advantages of the present disclosure will be described in detail in the following Detailed Description.

BRIEF DESCRIPTION OF DRAWINGS

The above and other features, advantages, and aspects of embodiments of the present disclosure will become more apparent in conjunction with the accompanying drawings and with reference to the following Detailed Description. Throughout the accompanying drawings, the same or similar reference numerals represent the same or similar elements. It should be understood that the drawings are schematic and that components and elements are not necessarily drawn to scale. In the accompanying drawings.

DETAILED DESCRIPTION

Figure 1:
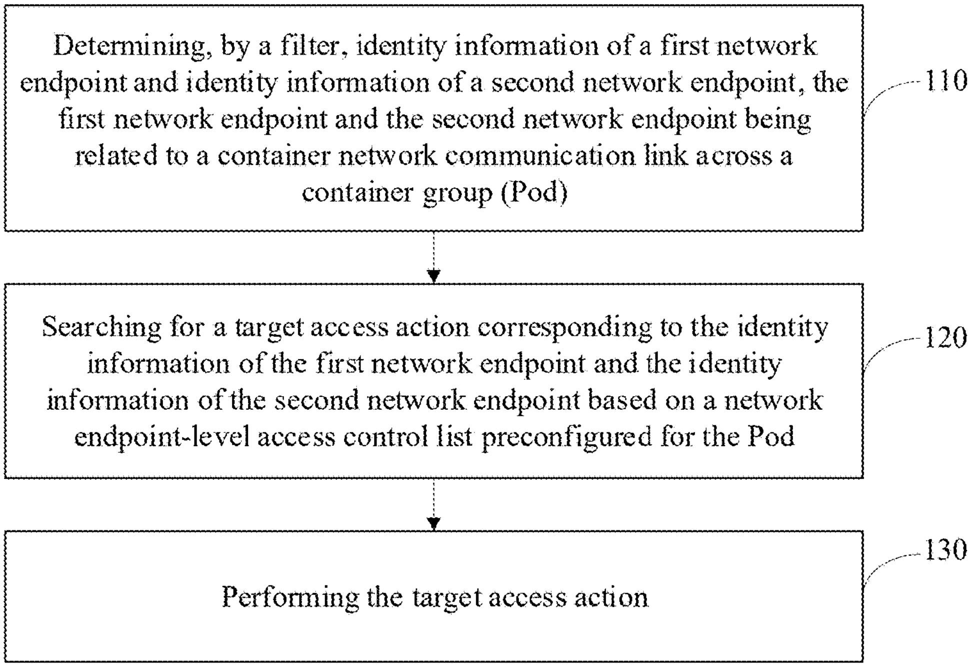
FIG. 1 is a flowchart of a container network access control method illustrated according to some embodiments.

Embodiments of the present disclosure will be described in more detail below with reference to the accompanying drawings. Although some embodiments of the present disclosure are shown in the accompanying drawings, it should be understood that the present disclosure can be implemented in various forms, and should not be interpreted as being limited to the embodiments set forth herein. On the contrary, these embodiments are provided for a more thorough and complete understanding of the present disclosure. It should be understood that the accompanying drawings and embodiments of the present disclosure are only for exemplary purposes, and are not intended to limit the protection scope of the present disclosure.

It should be understood that various steps described in the method implementations of the present disclosure may be performed in different orders and/or in parallel. In addition, the method implementations may include additional steps and/or omit the illustrated steps. The scope of the present disclosure is not limited in this regard.

As used herein, the term "include/comprise" and variations thereof are open-ended inclusions, that is, "include/comprise but not limited to". The term "based on" is "at least partially based on". The term "one embodiment" means "at least one embodiment"; the term "another embodiment" means "at least one further embodiment"; and the term "some embodiments" means "at least some embodiments". Relevant definitions of other terms will be given in the following description.

It should be noted that concepts such as "first" and "second" mentioned in the present disclosure are only used to distinguish between different apparatuses, modules, or units, and are not used to limit the order or interdependence of the functions performed by these apparatuses, modules, or units.

It should be noted that the modifications of "a" and "a plurality of" mentioned in the present disclosure are illustrative and not restrictive, and those skilled in the art should understand that unless the context clearly indicates otherwise, "a" and "a plurality of" should be understood as "one or more".

The names of messages or information interacted between a plurality of apparatuses in the implementations of the present disclosure are only used for illustrative purposes, and are not used to limit the scope of these messages or information.

Based on the technical solutions provided in the present disclosure, the identity information of the first network endpoint and the second network endpoint that are related to the container network communication link of the Pod are determined by the filter, the target access action corresponding to the identity information is searched for based on the network endpoint-level access control list preconfigured for the Pod, and the target access action is performed. In this way, network access control over the container can be implemented without relying on a network access control capability provided by an underlying infrastructure, and the adaptability is stronger. Moreover, network access control can be performed in the dimension of the network endpoint of the container, and in the scenario where the Pod has a plurality of network endpoints, network access control can be flexibly performed for different network endpoints based on requirements.

FIG. 1 is a flowchart of a container network access control method according to some embodiments. As shown in FIG. 1, an embodiment of the present disclosure provides a container network access control method, which may be performed by an electronic device, and specifically, may be performed by a container network access control apparatus. The apparatus may be implemented in software and/or hardware, and is configured in the electronic device. As shown in FIG. 1, the method may include the following steps.

In step 110, determining, by a filter, identity information of a first network endpoint and identity information of a second network endpoint, the first network endpoint and the second network endpoint being related to a container network communication link across a container group (Pod).

Here, the Pod is a basic deployment unit in a container orchestration system. The Pod may be understood as a container group encapsulating one or more containers, so that the containers in the Pod can share network and storage resources. The Pod is configured with a plurality of network endpoints to support container communication across Pods. One or more network endpoints may be configured in one Pod; therefore, the first network endpoint is any network endpoint in one Pod, and the second network endpoint is any network endpoint in another Pod.

Correspondingly, the container network communication link across the Pods may refer to a network communication link between a network endpoint of one Pod and a network endpoint of another Pod in the communication network.

The network endpoint (Endpoint) refers to a logical interface point used by the container for communication in the network. It should be noted that the network endpoint may actually be understood as an interface used by the container to communicate with other containers or external networks.

In the embodiment of the present disclosure, the filter may be an extended Berkeley packet filter (cBPF) program. The cBPF program is a high-performance, secure, and programmable data packet filtering technology running in the Linux kernel. In the embodiment of the present disclosure, traffic control of the network endpoint is implemented through the eBPF program.

The identity information may refer to Internet Protocol (IP) addresses of the first network endpoint and the second network endpoint. Certainly, the identity information may also refer to unique security identifiers designated in the communication network for the first network endpoint and the second network endpoint. The identity information is used for uniquely determining a communication entity in the communication network. In the embodiment of the present disclosure, the identity information of the first network endpoint and the identity information of the second network endpoint are used for determining communication parties (the first network endpoint and the second network endpoint) in the container network communication link across the Pods in the communication network, so as to establish a communication connection between the communication parties.

It should be noted that one of the first network endpoint and the second network endpoint may be a source end, and the other may be a destination end. For example, in the case where the first network endpoint is the source end, the second network endpoint is the destination end. In the case where the first network endpoint is the destination end, the second network endpoint is the source end.

When the first network endpoint and the second network endpoint are about to establish a communication connection, the identity information corresponding to the first network endpoint and the identity information corresponding to the second network endpoint may be determined by the cBPF program.

In step 120, searching for a target access action corresponding to the identity information of the first network endpoint and the identity information of the second network endpoint based on a network endpoint-level access control list preconfigured for the Pod.

Here, the network endpoint-level access control list is used to maintain an access action for network ingress and egress between network endpoints across Pods. The access action includes allowing access or denying access. The allowing access may refer to allowing the first network endpoint to communicate with the second network endpoint, and the denying access may refer to denying the first network endpoint to communicate with the second network endpoint.

For the Pod, the network endpoint-level access control list for the network endpoint may be configured according to different network endpoints used by the Pod. That is, the network endpoint-level access control list does not act on the entire Pod, but on a certain network endpoint in the Pod.

Based on this, in the communication scenario where the Pod uses a plurality of network endpoints (which may also be referred to as virtual network cards), corresponding network endpoint-level access control lists may be separately delivered for different network endpoints of different network planes, so that the network endpoint-level access control list can perform network access control for different network endpoints.

The access control list (ACL) is a mechanism used for computer and network security, and is used to define and control the access permission of a user or a system to a resource. It should be understood that the access control list may include access control rules configured by the user, and whether the first network endpoint and the second network endpoint can communicate with each other is determined through the access control rules.

It should be noted that the access control rule for the network endpoint is configured in the network endpoint-level access control list, and the target access action may be searched for from the access control rule configured in the network endpoint-level access control list corresponding to the identity information according to the identity information.

Exemplarily, the access control rule may indicate that the second network endpoint with the specified identity information (IP address) may access the first network endpoint. If the determined identity information is the IP address specified in the access control rule, the target access action is allowing access. If the identity information is not the IP address specified in the access control rule, the target access action is denying access.

In some embodiments, the network endpoint-level access control list may include a mapping relationship between the identity information as well as the network endpoint and the target access action. That is, in the network endpoint-level access control list, the identity information and the network endpoint are used as a key, and the target access action is used as a value corresponding to the key. Correspondingly, the corresponding target access action may be obtained by querying in the network endpoint-level access control list through the identity information and the first network endpoint. That is, the identity information and the first network endpoint are used as the key, the corresponding value is found in the network endpoint-level access control list, and the target access action is determined.

In some embodiments, the network endpoint-level access control list matching with the first network endpoint may be determined in the mapping table of the cBPF program according to the first network endpoint, and then the target access action of the first network endpoint and the second network endpoint is determined according to the identity information and the network endpoint-level access control list.

In the mapping table, the network endpoint-level access control list may be stored through a key-value pair (KV pair). Exemplarily, the network endpoint may be used as a key, the network endpoint-level access control list may be used as a value corresponding to the key, and access control lists for different network endpoints are stored in the mapping table. After acquiring the identity information, the eBPF program searches the mapping table of the cBPF program for the network endpoint-level access control list matching with the first network endpoint through the first network endpoint.

It should be noted that because the network endpoint-level access control list is configured for the specific network endpoint in the Pod, the corresponding network endpoint-level access control list may be found in the mapping table of the eBPF program through the identifier of the first network endpoint.

In step 130, performing the target access action.

Here, after the eBPF program determines the target access action for the first network endpoint and the second network endpoint, the eBPF program performs the target access action.

Exemplarily, in the case where the target access action is allowing access, the first network endpoint is allowed to communicate with the second network endpoint. In the case where the target access action is denying access, the first network endpoint is denied to communicate with the second network endpoint.

It is worth noting that for the network endpoints using different communication protocols, the target access action may be performed in a manner matching with the protocol used by the network endpoint, and the specific manner will be described in detail in the following implementations.

In this way, the identity information of the first network endpoint and the second network endpoint that are related to the container network communication link of the Pod are determined by the filter, the target access action corresponding to the identity information is searched for based on the network endpoint-level access control list preconfigured for the Pod, and the target access action is performed. The network access control for the container can be implemented without relying on a network access control capability provided by an underlying infrastructure, and the adaptability is stronger. Moreover, network access control can be performed in the dimension of the network endpoint of the container, and in the scenario where the Pod has a plurality of network endpoints, network access control can be flexibly performed for different network endpoints based on requirements.

In some implementable implementations, the plurality of network endpoints configured by the Pod support a plurality of network protocols, and the plurality of network protocols at least include a Transmission Control Protocol/Internet Protocol (TCP/IP) protocol and a Remote Direct Memory Access (RDMA) protocol.

Here, in the communication network, each Pod may be configured with a plurality of network endpoints supporting different network protocols for communication between containers in different Pods. Each network endpoint may use a Transmission Control Protocol/Internet Protocol (TCP/IP) protocol or a Remote Direct Memory Access (RDMA) protocol.

The RDMA is a technology that allows network hardware to directly transmit data between two nodes without involving a central processing unit (CPU) of a sender and a receiver, thereby reducing the latency and CPU load.

In some implementable implementations, in step 110, a data packet of a TCP/IP protocol stack via the first network endpoint is acquired by an extended Berkeley packet filter (cBPF) hooked on the first network endpoint of the Pod, and the identity information of the first network endpoint and the identity information of the second network endpoint are determined by parsing the data packet.

Here, the eBPF program may be hooked on the network endpoint of the Pod through a hook function, and is used for performing network access control on traffic of the TCP/IP protocol stack.

It should be understood that the traffic of the TCP/IP will be transmitted through the network endpoint of the Pod. Therefore, by hooking the eBPF program on the network endpoint of the Pod, data packet of the TCP/IP traffic can be acquired, and the identity information of the first network endpoint and the identity information of the second network endpoint are determined by parsing the data packet.

Exemplarily, the identity information corresponding to the first network endpoint and the second network endpoint that communicate using the TCP/IP protocol stack may be acquired through header information of the data packet, so as to perform network access control on the traffic of the TCP/IP.

The data packet passing through the first network endpoint of the Pod may be generated by the container in the Pod. For example, when the container in the Pod needs to communicate with the second network endpoint, the container generates the data packet to request to establish communication with the second network endpoint through the data packet. Certainly, the data packet passing through the first network endpoint of the Pod may also be sent by the second network endpoint to the first network endpoint of the Pod, and is used to request to establish communication with the container in the Pod.

In the embodiment of the present disclosure, whether it is a data packet generated by the container of the Pod of the first network endpoint or a data packet generated by the container of the Pod corresponding to the second network endpoint, the data packet will be acquired by the cBPF program when passing through the first network endpoint, so as to obtain the identity information of the first network endpoint and the identity information of the second network endpoint through the eBPF program.

It should be noted that for network endpoints using different network protocols, the forms of the identity information of the network endpoints are different. For example, for the TCP/IP protocol stack, the identity information may be an IP address of the first network endpoint and an IP address of the second network endpoint acquired through header information of the data packet of the TCP/IP protocol stack. For the RDMA protocol, the identity information may be an IP address used to establish RDMA communication, and the IP address includes a source IP address and a destination IP address.

The data packet of the TCP/IP protocol stack may be acquired through the cBPF program, and the corresponding identity information is acquired through the header information of the data packet. Then, the target access action corresponding to the first network endpoint and the second network endpoint is determined according to the identity information and the network endpoint-level access control list matching with the first network endpoint and stored in the mapping table of the eBPF program.

The header information of the data packet may refer to a set of information attached in front of the data packet in data communication, and is used to describe the attributes of the data packet. In the embodiment of the present disclosure, the header information of the data packet may include information such as an Internet Protocol (IP) address, a protocol, and a port number. The IP address may include a source IP address and a destination IP address of the data packet (the identity information of the first network endpoint and the identity information of the second network endpoint).

In the Pod creation process, the eBPF program may be hooked on the network endpoint of the Pod, and then a unique endpoint identifier, which is locally allocated, of the network endpoint is written into read-only data (rodata). When the eBPF program acquires the data packet passing through the first network endpoint of the Pod, the corresponding identity information may be acquired through the header information of the data packet, and then the network endpoint-level access control list corresponding to the endpoint identifier is found in the mapping table of the cBPF program according to the endpoint identifier of the first network endpoint, and the target access action is determined and performed according to the network endpoint-level access control list and the identity information, thereby implementing network access control on the traffic of the TCP/IP.

In some implementable implementations, the identity information of the first network endpoint and the second network endpoint that communicate using the RDMA protocol may be acquired by an extended Berkeley packet filter (eBPF) mounted on a system kernel probe.

Here, the eBPF program may be hooked on the kernel probe (kprobe) of the system through a hook function, to acquire the identity information of the first network endpoint and the second network endpoint that communicate using the RDMA protocol, thereby performing network access control on the RDMA communication.

It should be understood that in the RDMA communication, the system parses to obtain the identity information of RDMA communication parties (including the first network endpoint and the second network endpoint) by calling a function, and then establishes RDMA communication between the communication parties through the acquired identity information. By hooking the kernel probe of the system, in the process of the system parsing to obtain the identity information of the RDMA communication parties by calling the function, the eBPF program is triggered to be called, so that the eBPF program acquires the corresponding identity information. The eBPF program can acquire the identity information of the RDMA communication parties, thereby inserting an inspection process for RDMA CM traffic and implementing network access control on the RDMA CM traffic.

It should be noted that in the communication network, some network endpoints may support both the RDMA and the TCP/IP protocol stack, and the network endpoints supporting the RDMA are generally referred to as network endpoints using the RDMA protocol.

When the eBPF program acquires the identity information of the communication parties using the RDMA protocol from the kernel probe, the corresponding network endpoint-level access control list may be found in the mapping table of the eBPF program according to the first network endpoint of the Pod, and the target access action is determined and performed according to the network endpoint-level access control list and the identity information, thereby implementing network access control on the RDMA traffic.

Figure 2:
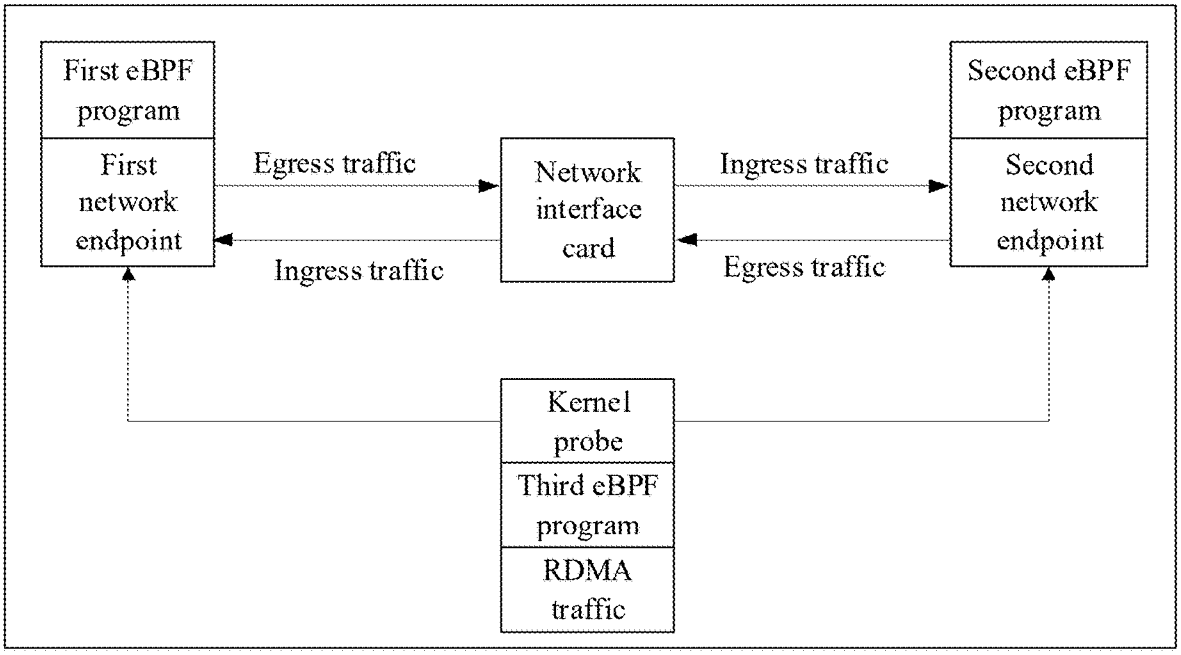
FIG. 2 is a schematic structural diagram of a data plane illustrated according to some embodiments.

FIG. 2 is a schematic structural diagram of a data plane according to some embodiments. As shown in FIG. 2, a first eBPF program is hooked on the first network endpoint through a hook function, and is used for performing network access control on egress traffic and ingress traffic of the first network endpoint. A second eBPF program is hooked on the second network endpoint through a hook function, and is used for performing network access control on egress traffic and ingress traffic of the second network endpoint. When ingress traffic or egress traffic arrives at the network endpoint of the Pod, the eBPF program is invoked to check whether the ingress traffic or the egress traffic conforms to the defined network endpoint-level access control list. If the ingress traffic or the egress traffic is allowed access, the ingress traffic will enter the Pod through the network endpoint. If the ingress traffic or the egress traffic is denied access, the ingress traffic or the egress traffic will be blocked from passing through the Pod.

A network interface card (NIC) is a hardware device used to connect to a network, and may be used to communicate with an external network or a local container.

A third eBPF program is hooked on the kernel probe of the system through a hook function. The kernel probe allows custom codes to be attached at the entry of the kernel function for monitoring and analyzing the kernel behavior. By mounting the third eBPF program on the kernel probe, the identity information of the RDMA traffic can be acquired, and network access control can be performed on the RDMA traffic.

It should be noted that the above first eBPF program, second eBPF program, and third cBPF program may be different eBPF programs, or may be the same eBPF program.

In this way, by mounting the eBPF program on the first network endpoint of the Pod, network access control over the TCP/IP traffic can be implemented. By mounting the cBPF program on the kernel probe of the system, network access control over the RDMA CM traffic can be implemented, to support security isolation of the RDMA network, thereby helping users to introduce a RDMA network with better performance into the container network, and enabling the container network to have better expandability.

In some implementable implementations, the network endpoint-level access control list may be delivered and stored in the mapping table of the eBPF program in advance, and the network endpoint-level access control list is generated by the container orchestration system for the network endpoint configuration of the Pod.

Here, the mapping table (which may also be referred to as Maps) of the eBPF program is a data structure in the eBPF program, and is used to transmit data between the user space and the kernel space. The network endpoint-level access control list configured for different network endpoints of the Pod is stored in the mapping table.

In some embodiments, corresponding configuration information may be configured according to the network protocol supported by the network endpoint in the Pod through the custom resource provided by the container orchestration system in combination with the access control list configuration template. The configuration information includes the access control rule and the network endpoint specified to apply the access control rule, and the network endpoint-level access control list is generated according to the configuration information.

Here, the container orchestration system may be Kubernetes. Kubernetes is an open-source container orchestration system, which is used to automate the deployment, expansion, and management of containerized applications. The Pod of the Kubernetes cluster serves as the host of the container, and the Pod is the basic deployment unit in the Kubernetes cluster.

The custom resource (CR) is a concept in Kubernetes, and allows a user to extend the Kubernetes API (interface) to create and use resource types belonging to the user itself. The custom resource may usually be defined through Custom Resource Definitions (CRD). The CRD is a Kubernetes API resource, which is used to register and define the custom resource type.

The custom resource may be defined in the container orchestration system, and the corresponding configuration information is configured in the custom resource through the pre-configured access control list configuration template. The configuration information includes the access control rule and the network endpoint of the Pod that is instructed to apply the access control rule.

The access control list configuration template is used to provide a plurality of groups of parameters to configure the access control rule for the network endpoint. Exemplarily, the access control list configuration template is used to configure the access control rule for the network endpoints of different network protocols in the Pod and the network endpoint to which the access control rule is applied through a plurality of groups of predefined parameters.

Through the access control list configuration template, the user may configure the corresponding access control rules for the network endpoints with different network protocols, so as to separately deliver the access control rules for the network endpoints with different network protocols.

Exemplarily, the custom resource is created in the container orchestration system corresponding to the Pod, and the corresponding configuration information is configured in the custom resource through the pre-configured access control list configuration template. The custom resource is acquired from the container orchestration system through a user-mode program of the container orchestration system, the network endpoint-level access control list is generated according to the configuration information carried in the custom resource, and the network endpoint-level access control list is stored in the mapping table of the cBPF program.

Figure 3:
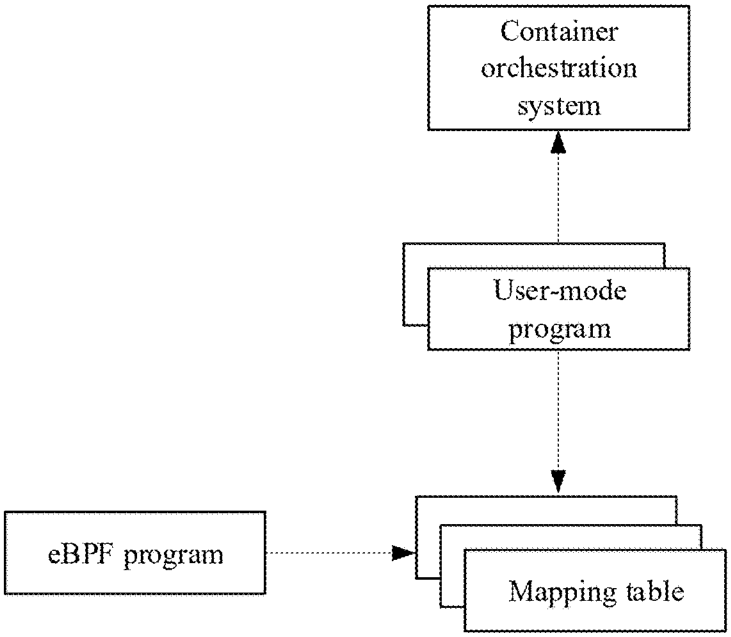
FIG. 3 is a schematic diagram of a mapping table illustrated according to some embodiments.

FIG. 3 is a schematic diagram of a mapping table according to some embodiments. As shown in FIG. 3, the user-mode program deployed on each node of the container orchestration system (Kubernetes cluster) may monitor (watch) the custom resource in the container orchestration system, and the user-mode program receives a notification when the state of the custom resource changes. When the user-mode program receives the notification, the user-mode program acquires the custom resource from the container orchestration system, calculates the network endpoint-level access control list for the network endpoint of the Pod according to the access control rule defined by the custom resource and the network endpoint of the Pod to which the access control rule is applied, and stores the network endpoint-level access control list in the mapping table of the eBPF program. The eBPF program may read the corresponding network endpoint-level access control list from the mapping table.

In this way, through the custom resource, the user can configure the customized network endpoint-level access control list, and through the user-mode program, the change of the custom resource can be detected, and the user-mode program can update the network endpoint-level access control list in real time without manual intervention, thereby automatically managing complex network access control policies in large-scale container deployment and improving efficiency.

In some implementable implementations, for the network endpoint using the TCP/IP protocol stack, the access control list configuration template includes the following parameters: a first parameter used to indicate an ingress access control rule of the network endpoint of the Pod, a second parameter used to indicate an egress access control rule of the network endpoint of the Pod, a third parameter used to specify the Pod to which the access control rule is applied, and a fourth parameter used to specify the network endpoint, to which the access control rule is applied, in the Pod by creating a CNI name of the network endpoint.

Here, the ingress access control rule refers to the access control rule for traffic entering the Pod through the network endpoint. The ingress access control rule of the network endpoint of the Pod may be indicated through the first parameter, thereby allowing or denying a specific remote endpoint to communicate with the container in the Pod.

It should be noted that the remote endpoint refers to another communication endpoint of the network endpoint of the Pod in the network. That is, the remote endpoint may be a network endpoint in another Pod or an external network that needs to communicate with the network endpoint of the Pod.

Exemplarily, the ingress access control rule may be configured in the access control list configuration template through the following first parameter.

```
{
ingress: (defining the ingress access control rule)
  - fromGroups: (allowing traffic from a specific network endpoint group)
    - "group3" (traffic from a network endpoint group group3)
  - fromEntities: (allowing traffic from a specific entity)
    - "sys-node" (traffic from a system node)
```

-continued

```
  - fromCIDRs: (allowing traffic from a specific IP range)
    - "192.168.0.0/16" (traffic from 192.168.0.0 to 192.168.255.255)
}
```

The egress access control rule refers to the access control rule for traffic exiting the Pod through the network endpoint. The egress access control rule of the network endpoint of the Pod may be indicated through the second parameter, thereby allowing or denying the container in the Pod to actively communicate with the remote endpoint.

Exemplarily, the egress access control rule may be configured in the access control list configuration template through the second parameter.

```
{
egress: (defining the egress access control rule)
  - toGroups: (allowing traffic to a specific network endpoint group)
    - "group3" (traffic sent to a network endpoint group group3)
  - toEntities: (allowing traffic to a specific entity)
    - "sys-node" (traffic to a system node)
  - toCIDRs: (allowing traffic to a specific IP range)
    -"172.168.0.0/16" (traffic sent to 172.168.0.0 to 172.168.255.255)
}
```

It should be noted that the ingress access control rule and the egress access control rule actually indicate that the network endpoints corresponding to which identity information can communicate with each other and/or the network endpoints corresponding to which identity information cannot communicate with each other.

The third parameter is used to specify the Pod to which the above ingress access control rule and egress access rule are applied, and the fourth parameter is used to specify the network endpoint in the Pod to which the access control rule is applied by creating the CNI name of the network endpoint. The CNI (Container Network Interface) is a specification of the container network, and defines the interface standard between the container management and the network plug-in, so that when different containers are running, the different containers can interact with various network plug-ins through a unified interface.

Exemplarily, the third parameter and the fourth parameter in the access control list configuration template may be configured through the following fields to configure the access control rule that applies the above configuration.

```
  {
  spec: (specifying a specific configuration)
     endpointSelector: (a selector, used to select a network endpoint to which the access
control rule is applied)
         networkSelector: (a network selector, used to select a specific network)
             cniName:RDMA (selecting, by specifying the CNI name of the network endpoint,
the network endpoint in the Pod to which the access control rule is applied, here, it is RDMA,
indicating that a network endpoint of a RDMA type is the network endpoint in the Pod to which
the access control rule is applied)
         labelSelector: (a label selector, used to specify the Pod to which the access control
rule is applied)
             matchLabels: (a key-value pair matching a label)
                 networking.k8s.volcengine.com/acl-group: "group1" (a label key with a value of
group1)
             matchExpressions: (an expression selector)
             - key: app (a label key, here it is app)
                 operator: In (an operator, here it is In, indicating that the value is in the list)
                 values: (a value list, here it is ["nccl"])
             - "nccl"
  }
```

It should be noted that because the label is on the Pod, the Pod to which the access control rule is applied may be selected through the labelSelector. Moreover, the network endpoint using the specified CNI name in the specified Pod may be selected through the CNI name of the network endpoint, and the access control rule is applied to the network endpoint. For example, in the above example, the network endpoint using the RDMA communication protocol in the specified Pod may be instructed through cniName:

RDMA and the above ingress access control rule and the above egress access control rule are applied to the network endpoint using the RDMA communication protocol.

It should be noted that specifying, through the CNI name, the network endpoint, to which the access control rule is applied, in the Pod may be understood as that the network endpoints corresponding to all the specified CNI names in the Pod apply the above access control rule. That is, the network endpoints created by using the CNI named RDMA all use the above ingress access control rule and egress access control rule.

In this way, through the above access control list configuration template, the user can define the access control rule for the traffic of the TCP/IP.

In some implementable implementations, for the network endpoint of the container that communicates using the Remote Direct Memory Access protocol, the access control list configuration template includes the following parameters: a fifth parameter used to indicate an access control rule of a destination network endpoint group in the RDMA, a sixth parameter used to indicate a source network endpoint group in the RDMA, and a seventh parameter used to specify, by creating a CNI name of the network endpoint, the network endpoint, to which the access control rule is applied, in the source network endpoint group.

Here, the fifth parameter is used to indicate the access control rule for the specified destination network endpoint group (Remote Endpoint) in the Remote Direct Memory Access protocol RDMA, where the specified destination network endpoint group may refer to a specific network endpoint group in the RDMA network. Through the fifth parameter, it may be indicated that the specified destination network endpoint groups are allowed or denied to communicate with each other. The sixth parameter indicates the source network endpoint group (groupSelector) to which the access control rule is applied in the RDMA. The seventh parameter specifies, by creating the CNI name of the network endpoint, the network endpoint to which the access control rule is applied in the source network endpoint group. For example, groupA is specified in the groupSelector and groupB is specified in the remoteEndpoints, it indicates that the network endpoint group of groupA may allow the network endpoint group of groupB to communicate.

Exemplarily, the corresponding access control rule and the network endpoint to which the access control rule is applied may be configured in the access control list configuration template through the following fields.

It should be noted that the access control rule for the specified destination network endpoint group in the RDMA network may be indicated through remoteEndpoints: (the fifth parameter). For example, in the above example, the network endpoints in group1 and group2 in the RDMA network can communicate with each other. The network endpoint using the specified CNI name in the specified groupSelector may be selected through the CNI name of the network endpoint to apply the above access control rule. For example, in the above example, the network endpoint supporting the RDMA communication protocol in the specified source network endpoint group may be instructed, through cniName:rdma, to apply the above access control rule.

It should be noted that the access control rule for the destination network endpoint group in the RDMA actually indicates that the network endpoints corresponding to which identity information can communicate with each other and/or the network endpoints corresponding to which identity information cannot communicate with each other in the RDMA communication.

In this way, through the above access control list configuration template, the user can define the access control rule for the traffic of the RDMA, and network access control for the RDMA traffic may be implemented to support security isolation of the RDMA network, thereby helping users introduce a RDMA network with better performance into the container network, and enabling the container network to have better expandability.

It should be noted that the field used to define the custom resource may be included in each access control list configuration template. For example, a custom resource for configuring the access control rule may be created in the custom resource of the container orchestration system through the following fields.

```
{
  spec: (specifying the specific configuration of the access control rule)
  endpointSelector: (a selector, used to select the network endpoint to which the access
control rule is applied)
  networkSelector: (a network selector, used to select a specific network)
    cniName:rdma (selecting, by specifying the CNI name of the network endpoint, the
network endpoint to which the access control rule is applied, here, it is RDMA, indicating that the
network endpoint of the RDMA type is the network endpoint to which the access control rule is
applied)
  groupSelector: (used to select a specific RDMA source network endpoint group, and
the access control rule is applied to network entities defined in these source network endpoint
groups, in this case group2 and group1)
  -"group2"
  -"group1"
  remoteEndpoints: (defining the destination network endpoint group, representing
which groups of nodes are allowed to communicate with RDMA, in this case group1 and group2)
  -groups:
  -"group1"
  -"group2"
  }
```

{
apiVersion: apiversion (API version number, which is used to notify the Kubernetes API server which version of the specification should be used to parse and process this resource
definition)
kind: ClusterNetworkACL (resource type, indicating that this is a cluster-level access control list)
metadata: (name of the resource)
name:name
}

It should be understood that through the above fields, a custom resource may be defined in the container orchestration system, so as to configure the corresponding access control rule and the network endpoint to which the access control rule is applied through the custom resource in combination with the access control list configuration template.

In some implementable implementations, in step 130, the target access action may be performed based on the network protocol of the first network endpoint and the network protocol of the second network endpoint.

In some embodiments, if the first network endpoint and the second network endpoint use the RDMA protocol, the target access action is performed to allow or interrupt the first network endpoint and the second network endpoint to establish a communication connection.

Here, before transmitting information, the RDMA communication needs to exchange communication control information. If the communication control information cannot be exchanged, the subsequent data information transmission cannot be successful. Before the two communication parties of the RDMA exchange communication control information, the identity information of the two communication parties (the first network endpoint and the second network endpoint) needs to be determined. The cBPF program in the embodiment of the present disclosure inserts a process of checking the identity information into the process of determining the identity information, so as to determine whether the two communication parties of the RDMA can perform a subsequent communication process.

Figure 4:
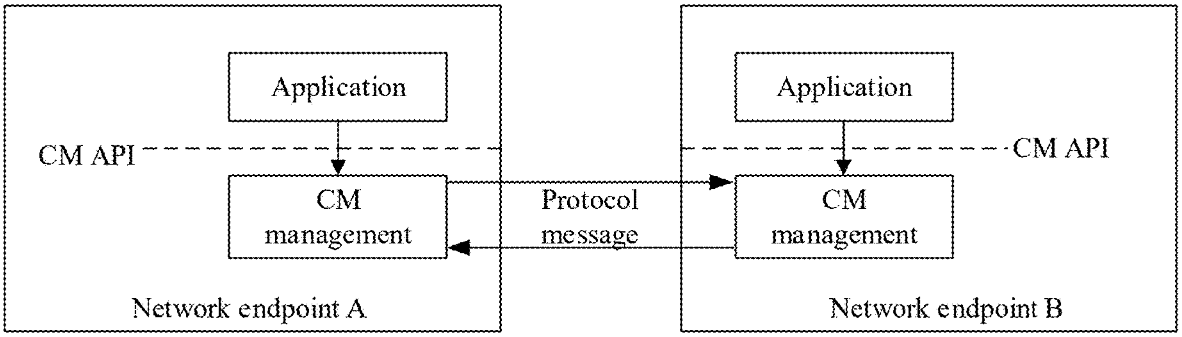
FIG. 4 is a schematic diagram of RDMA communication illustrated according to some embodiments.

FIG. 4 is a schematic diagram of RDMA communication according to some embodiments. As shown in FIG. 4, at a network endpoint A and a network endpoint B, an RDMA communication application relies on a connection management (CM) API to complete the connection establishment. The process of the connection establishment is a process in which the two participating parties (the network endpoint A and the network endpoint B) of the protocol shake hands with each other for trust. The CM management of the network endpoint A and the network endpoint B exchanges communication control information through the protocol message in the handshake process to obtain information such as the QPN (Queue Pair Number), the virtual address, and the remote key (a security mechanism used to access the remote memory in the RDMA communication) of the other party.

Therefore, in the Kubernetes cluster, the RDMA traffic between two network endpoints is managed, and the information exchange process between the two network endpoints may be managed. If the target access action is the allowing access action, the first network endpoint is allowed to establish a communication connection with the remote endpoint through the corresponding identity information. If the target access action is the denying access action, the connection establishment process of the first network endpoint establishing a communication connection with the remote endpoint through the corresponding identity information is interrupted.

For example, when the network endpoint A takes the initiative to communicate with the network endpoint B, the identity information of the network endpoint A and the network endpoint B used to request to establish the RDMA communication is acquired through the cBPF program, and whether the network endpoint A is allowed to communicate with the network endpoint B is checked through the identity information and the corresponding network endpoint-level access control list. If communication is allowed, the connection is allowed, and the connection establishment process continues. If communication is not allowed, the connection establishment process is interrupted, and the original connection establishment process fails.

For another example, it is assumed that the network endpoint A and the node itself are allowed to communicate, and the network endpoint B passively receive the connection request sent by the network endpoint A. When the network endpoint B plans to agree to and reply to the connection request of the network endpoint A, the identity information of the network endpoint A and the network endpoint B used to request to establish the RDMA communication is acquired through the cBPF program, and whether the network endpoint A is allowed to communicate with the network endpoint B is checked through the identity information and the corresponding network endpoint-level access control list. If communication is allowed, the connection is allowed, and the connection establishment process continues. If communication is not allowed, the connection establishment process is interrupted, and the original connection establishment process fails.

In this way, through the above implementations, network access control over the RDMA traffic may be implemented, so that the RDMA communication protocol may be used in the Kubernetes cluster.

In some embodiments, if the first network endpoint and the second network endpoint use the TCP/IP protocol, the target access action is performed to allow the TCP/IP data packet to be transmitted through the first network endpoint or to discard the TCP/IP data packet.

Here, when performing network access control on the traffic of the TCP/IP, if the access action determined by the eBPF program is allowing access, the cBPF program allows the data packet to pass through the first network endpoint. Allowing the data packet to pass through the first network endpoint may refer to allowing the data packet to enter the first network endpoint, so as to establish a connection between the first network endpoint and the second network endpoint through the data packet. Certainly, allowing the data packet to pass through the first network endpoint may refer to allowing the data packet to be sent from the first network endpoint to the second network endpoint, so as to request, through the data packet, that the second network endpoint establishes a connection with the first network endpoint. If the access action determined by the eBPF program is denying access, the BFPM program discards the data packet, and denies the first network endpoint to communicate with the second network endpoint.

It should be noted that in the TCP/IP protocol stack, the identity information is acquired through the header information of the data packet. Correspondingly, if the access action determined by the eBPF program is allowing access, the cBPF program allows the data packet to pass through the first network endpoint. If the access action determined by the cBPF program is denying access, the eBPF program discards the data packet, and denies the first network endpoint from communicating with the second network endpoint.

In this way, through the above implementations, network access control on the TCP/IP traffic may be implemented.

Correspondingly, in step 120, if the first network endpoint and the second network endpoint use the RDMA protocol, a first network endpoint group to which the first network endpoint belongs and a second network endpoint group to which the second network endpoint belongs are determined according to the identity information of the first network endpoint and the identity information of the second network endpoint; the access control rule that allows the first network endpoint group and the second network endpoint group to communicate is searched for in the network endpoint-level access control list according to the first network endpoint group and the second network endpoint group; and in response to finding the access control rule, the access action is determined as allowing access, and in response to not finding the access control rule, the access action is determined as denying access.

Here, in the case where the first network endpoint and the second network endpoint use the RDMA protocol, the identity information may be a first IP address of the first network endpoint and a second IP address of the second network endpoint. One of the first IP address and the second IP address is a source IP address, and the other is a destination IP address.

The mapping relationship between the IP address and the network endpoint group may be maintained. Exemplarily, the network endpoint group ID to which the container in the Pod belongs may be acquired from the Annotation of the Pod, and the IP address corresponding to the container is acquired from the Pod, and then the mapping relationship between the IP address and the network endpoint group is constructed according to the acquired IP address and the network endpoint group ID. The network endpoint group ID may also be referred to as the network security identifier corresponding to the network endpoint group.

The first network endpoint group to which the first IP address belongs and the second network endpoint group to which the second IP address belongs may be queried from the mapping relationship between the IP address and the network endpoint group through the first IP address and the second IP address.

Then, the network endpoint-level access control list matching with the first network endpoint is searched for, through the IDs corresponding to the first network endpoint group and the second network endpoint group, to find whether there is an access control rule, in the network endpoint-level access control list, that allows the first network endpoint group and the second network endpoint group to communicate.

It should be noted that the existence of the access control rule that allows the first network endpoint group and the second network endpoint group to communicate indicates that the network endpoint in the first network endpoint group and the network endpoint in the second network endpoint group may perform RDMA communication.

Correspondingly, in the case where the corresponding access control rule exists in the network endpoint-level access control list, the access action is determined as allowing access. In the case where the access control rule does not exist in the network endpoint-level access control list, the access action is determined as denying access.

Figure 5:
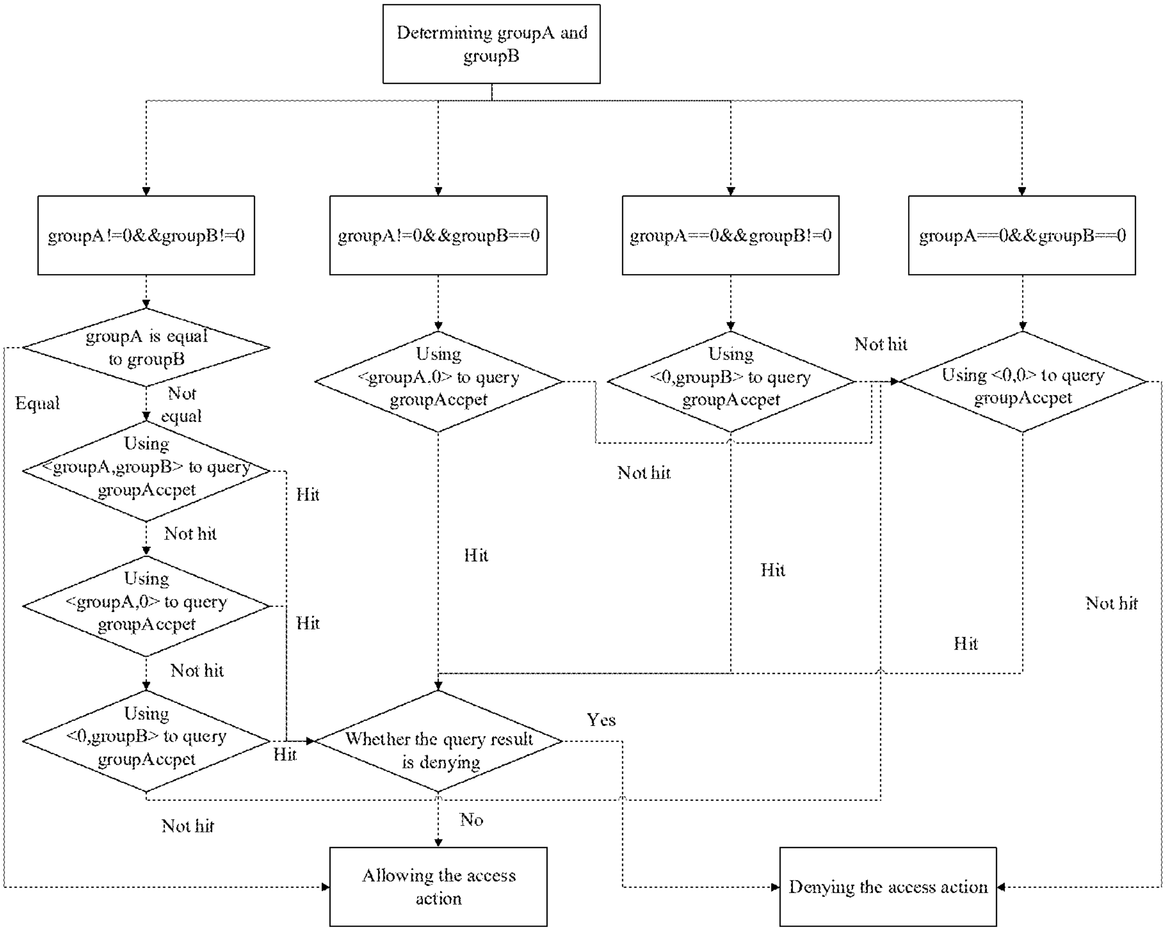
FIG. 5 is a flowchart of determining a target access action illustrated according to some embodiments.

FIG. 5 is a flowchart of determining a target access action according to some embodiments. As shown in FIG. 5, the first network endpoint group is denoted as groupA, and the second network endpoint group is denoted as groupB. If groupA is not found, groupA==0. If groupB is not found, groupB==0. Therefore, according to the query result, there are four cases; and groupA!=0&&groupB!=0, groupA!=0&&groupB==0, groupA==0&&groupB!=0, groupA==0&&groupB==0.

For the case of groupA!=0&&groupB!=0, if groupA is equal to groupB, it indicates that the network endpoints in the same network endpoint group communicate, and the access action is allowing access. If groupA is not equal to groupB, the corresponding network endpoint-level access control list (groupAccpet) is searched for by using a sequence <groupA, groupB>. If the sequence is hit in the network endpoint-level access control list, whether the query result is denying (reject) is judged, if the query result is denying, the access action is denying access; if the query result is not denying, the access action is allowing access. If the sequence <groupA,groupB> fails to hit, the network endpoint-level access control list is searched for by using a sequence <groupA,0>. If the sequence <groupA,0> still fails to hit, the network endpoint-level access control list continues to be searched for by using a sequence <0,groupB>. If the sequence <0,groupB> still fails to hit, the network endpoint-level access control list continues to be searched for by using a sequence <0,0>.

It should be noted that in the sequence <groupA,0>, groupA is set to 0, indicating whether there is an access control rule in the network endpoint-level access control list that allows groupA to communicate with all network endpoint groups. Similarly, the sequence <0,groupB> indicates whether there is an access control rule in the network endpoint-level access control list that allows all network endpoint groups to communicate with groupB. The sequence <0,0> indicates whether there is an access control rule in the network endpoint-level access control list that allows any two network endpoint groups to communicate.

For the remaining cases of groupA!=0&&groupB==0, groupA==0&&groupB!=0, and groupA==0&&groupB==0, similarly, whether there is an access control rule in the network endpoint-level access control list that allows groupA and groupB to communicate is also queried in the corresponding network endpoint-level access control list through the above method.

In this way, through the above implementations, network access control may be performed on the RDMA traffic, thereby introducing RDMA communication in the Kubernetes cluster.

In some implementable implementations, for the network endpoint-level access control list for the TCP/IP protocol stack, the access control rule may include at least one selected from a group comprising: a security identification (sec_id) rule and a classless inter-domain routing (CIDR) rule.

The sec_id rule refers to a rule based on the network security identifier of the network endpoint group. The network security identifier is an identifier of a user, a group, or a service, and the identifier is used to identify an entity in a security context. The CIDR rule is a manner used to specify an IP address and a subnet mask to perform network access control. The CIDR rule is usually used to define which IP address scopes are allowed or denied to access specific network resources.

Correspondingly, when performing network access control on the traffic of the TCP/IP, whether the access action is between the first network endpoint and the remote endpoint may be judged by querying the access control rules one by one.

Figure 6:
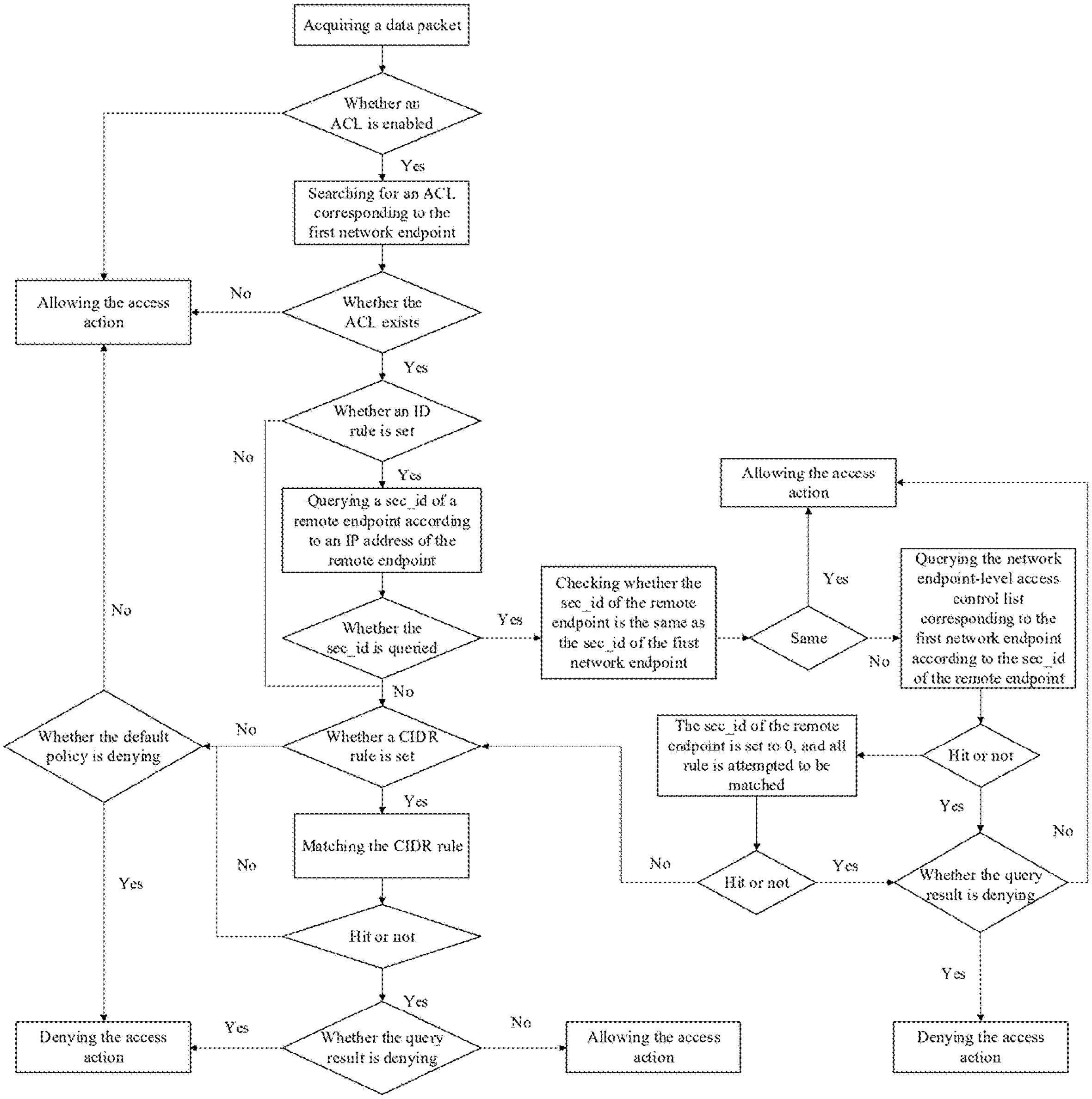
FIG. 6 is a flowchart of determining a target access action illustrated according to yet some embodiments.

FIG. 6 is a flowchart of determining an access action according to yet some embodiments. As shown in FIG. 6, the eBPF program acquires a data packet to determine identity information through header information of the data packet, and judges whether an ACL is enabled. In the case where the ACL is not enabled, the access action is allowing access. In the case where the ACL is enabled, an ACL corresponding to the first network endpoint is searched for. If the corresponding ACL is not found, the access action is allowing access. If the corresponding ACL is found, whether an ID rule is set (equivalent to setting a sec_id rule) is further judged. If the ID rule is set, a sec_id of a remote endpoint is queried according to an IP address of the remote endpoint. If the sec_id is not queried, whether a CIDR rule is set is checked. If the CIDR rule is set, the CIDR rule is matched, and whether a corresponding rule is hit in the CIDR rule is judged. If the query result is denying, the access action is denying access. If the query result is not denying, the access action is allowing access. If the corresponding rule is not matched in the CIDR rule, the access action is determined by a default policy. The default policy is customized by the user. If no rule is matched, the access action is determined by the default policy.

If the sec_id is found, whether the sec_id of the remote endpoint is the same as the sec_id of the first network endpoint is checked, if the sec_id of the remote endpoint is the same as the sec_id of the first network endpoint, the access action is allowing access; if the sec_id of the remote endpoint is not the same as the sec_id of the first network endpoint, the network endpoint-level access control list corresponding to the first network endpoint is queried according to the sec_id of the remote endpoint. If the corresponding rule is hit, whether the query result is denying is judged, if the query result is denying, the access action is denying access; if the query result is not denying, the access action is allowing access. If the corresponding rule is not hit in the CIDR rule, the access action is determined by the default policy.

If the corresponding rule is not hit when searching for the network endpoint-level access control list corresponding to the first network endpoint according to the sec_id of the remote endpoint, the sec_id of the remote endpoint is set to 0, and an all rule is attempted to be matched.

It should be noted that setting the sec_id of the remote endpoint to 0 indicates whether there is an access control rule in the network endpoint-level access control list, and the access control rule allows the network endpoint to which the access control rule is applied to access all network endpoints.

Figure 7:
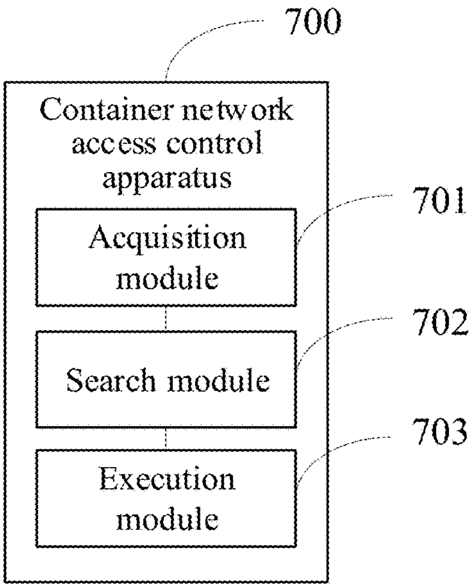
FIG. 7 is a schematic structural diagram of a container network access control apparatus illustrated according to some embodiments.

FIG. 7 is a schematic structural diagram of a container network access control apparatus according to some embodiments. As shown in FIG. 7, an embodiment of the present disclosure provides a container network access control apparatus 700. The container network access control apparatus 700 may include:

an acquisition module 701, configured to determine, by a filter, identity information of a first network endpoint and identity information of a second network endpoint, where the first network endpoint and the second network endpoint are related to a container network communication link across a container group Pod, the Pod is configured with a plurality of network endpoints to support container communication across Pod;

a search module 702, configured to search for a target access action corresponding to the identity information of the first network endpoint and the identity information of the second network endpoint based on a network endpoint-level access control list preconfigured for the Pod, where the network endpoint-level access control list is used to maintain an access action for network ingress and egress between network endpoints across Pod, and the access action includes allowing access or denying access; and an execution module 703, configured to perform the target access action.

Optionally, the plurality of network endpoints configured by the Pod support a plurality of network protocols, and the plurality of network protocols at least include a Transmission Control Protocol/Internet Protocol (TCP/IP) protocol and a Remote Direct Memory Access (RDMA) protocol.

Optionally, the acquisition module 701 is specifically configured to:

acquire, by an extended Berkeley packet filter (eBPF) hooked on the first network endpoint of the Pod, a data packet of a TCP/IP protocol stack via the first network endpoint, and parse the data packet to determine the identity information of the first network endpoint and the identity information of the second network endpoint.

Optionally, the acquisition module 701 is specifically configured to:

acquire the identity information of the first network endpoint and the identity information of the second network endpoint by an extended Berkeley packet filter (eBPF) hooked on a system kernel probe. The first network endpoint and the second network endpoint communicate using the RDMA protocol.

Optionally, the container network access control apparatus 700 further includes:

a sending module, configured to deliver and store the network endpoint-level access control list in a mapping table of the eBPF program in advance, where the network endpoint-level access control list is generated by a container orchestration system for the network endpoint configuration of the Pod.

Optionally, the sending module is further configured to:

configure configuration information according to a network protocol supported by the network endpoint in the Pod through a custom resource provided by the container orchestration system in combination with an access control list configuration template, where the configuration information includes the access control rule and the network endpoint specified to apply the access control rule, and the access control list configuration template is used to provide a plurality of groups of parameters to configure the access control rule for the network endpoint; and generate the network endpoint-level access control list according to the configuration information.

Optionally, the execution module 703 is specifically configured to:

perform the target access action based on a network protocol of the first network endpoint and a network protocol of the second network endpoint.

Optionally, the execution module 703 is specifically configured to:

if the first network endpoint and the second network endpoint use the RDMA protocol, perform the target access action to allow or interrupt the first network endpoint and the second network endpoint to establish a communication connection; and if the first network endpoint and the second network endpoint use the TCP/IP protocol, perform the target access action to allow the TCP/IP data packet to be transmitted through the first network endpoint or to discard the TCP/IP data packet.

Optionally, the search module 702 is specifically configured to:

if the first network endpoint and the second network endpoint use the RDMA protocol, determine a first network endpoint group to which the first network endpoint belongs and a second network endpoint group to which the second network endpoint belongs according to the identity information of the first network endpoint and the identity information of the second network endpoint;

search for an access control rule that allows the first network endpoint group and the second network endpoint group to communicate in the network endpoint-level access control list according to the first network endpoint group and the second network endpoint group; and determine the access action to be allowing access in response to finding the access control rule, and determine the access action to be denying access in response to not finding the access control rule.

For the logic of the method executed by various functional modules in the above container network access control apparatus 700, reference may be made to the part related to the method in the above embodiments, which will not be repeated here.

Figure 8:
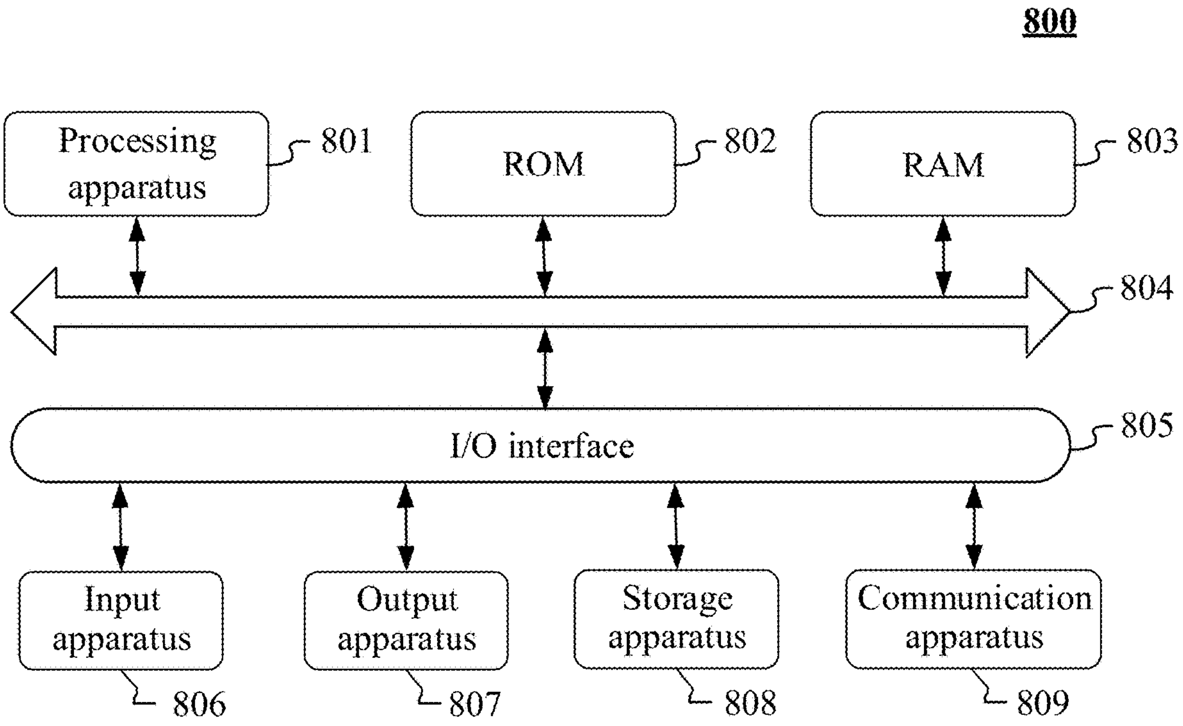
FIG. 8 is a schematic structural diagram of an electronic device illustrated according to some embodiments.

Reference is made to FIG. 8 below, which illustrates a schematic structural diagram of an electronic device (such as a terminal device or a server) 800 suitable for implementing the embodiments of the present disclosure. The terminal device in the embodiment of the present disclosure may include, but is not limited to, a mobile terminal such as a mobile phone, a laptop, a digital broadcast receiver, a personal digital assistant (PDA), a PAD (tablet computer), a portable multimedia player (PMP), and an in-vehicle terminal (such as an in-vehicle navigation terminal), and a fixed terminal such as a digital TV and a desktop computer. The electronic device shown in FIG. 8 is only an example, and should not impose any limitation to the function and usage scope of the embodiments of the present disclosure.

As shown in FIG. 8, the electronic device 800 may include a processing apparatus (such as a central processing unit and a graphics processor) 801. The processing apparatus 801 may execute various appropriate actions and processing according to a program stored in a read-only memory (ROM) 802 or a program loaded from a storage apparatus 808 into a random access memory (RAM) 803. Various programs and data necessary for the operation of the electronic device 800 are also stored in the RAM 803. The processing apparatus 801, the ROM 802, and the RAM 803 are connected to each other through a bus 804. An input/output (I/O) interface 805 is also connected to the bus 804.

Generally, the following apparatus may be connected to the I/O interface 805: an input apparatus 806 including, for example, a touchscreen, a touchpad, a keyboard, a mouse, a camera, a microphone, an accelerometer, a gyroscope, and the like; an output apparatus 807 including, for example, a liquid crystal display (LCD), a speaker, a vibrator, and the like; a storage apparatus 808 including, for example, a magnetic tape, a hard disk, and the like; and a communication apparatus 809. The communication apparatus 809 may allow the electronic device 800 to perform wireless or wired communication with other devices to exchange data. Although FIG. 8 shows the electronic device 800 having various apparatuses, it should be understood that not all of the illustrated apparatuses are necessarily implemented or provided. Alternatively, more or fewer apparatuses may be implemented or provided.

In particular, according to the embodiments of the present disclosure, the processes described above with reference to the flowcharts may be implemented as a computer software program. For example, an embodiment of the present disclosure includes a computer program product, which includes a computer program carried on a non-transitory computer-readable medium, and the computer program includes program codes for executing the method shown in the flowchart. In such an embodiment, the computer program may be downloaded and installed from a network through the communication apparatus 809, or may be installed from the storage apparatus 808, or may be installed from the ROM 802. When the computer program is executed by the processing apparatus 801, the above functions defined in the method of the embodiment of the present disclosure are executed.

It should be noted that the above computer-readable medium in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus or device, or any combination thereof. More specific examples of the computer-readable storage medium may include, but are not limited to, an electrical connection with one or more wires, a portable computer magnetic disk, a hard disk, a random access memory (RAM), a read-only memory (ROM), an erasable programmable read-only memory (EPROM) or flash memory, an optical fiber, a portable compact disc read-only memory (CD-ROM), an optical storage device, a magnetic storage device, or any suitable combination thereof. In the present disclosure, the computer-readable storage medium may be any tangible medium containing or storing a program that can be used by or in combination with an instruction execution system, apparatus or device. In the present disclosure, a computer-readable signal medium may include a data signal propagated in a baseband or as part of a carrier wave, in which computer-readable program codes are carried. Such propagated data signal may take a variety of forms, including but not limited to an electromagnetic signal, an optical signal, or any suitable combination thereof. The computer-readable signal medium may also be any computer-readable medium other than the computer-readable storage medium. The computer-readable signal medium may send, propagate, or transmit a program used by or in combination with the instruction execution system, apparatus or device. The program codes contained on the computer-readable medium may be transmitted by any suitable medium, including but not limited to an electric wire, an optical cable, a radio frequency (RF), or any suitable combination thereof.

In some implementations, the electronic device may communicate using any currently known such as Hypertext Transfer Protocol (HTTP) or future-developed network protocol, and may be interconnected with any form or medium of digital data communication (for example, a communication network). Examples of the communication network include a local area network ("LAN"), a wide area network ("WAN"), an internet (for example, the Internet), and a peer-to-peer network (for example, an ad hoc peer-to-peer network), as well as any currently known or future-developed network.

The above computer-readable medium may be included in the above electronic device; or may also exist alone without being assembled into the electronic device.

The above computer-readable medium carries one or more programs which, when executed by the electronic device, cause the electronic device to: determine, by a filter, identity information of a first network endpoint and identity information of a second network endpoint, where the first network endpoint and the second network endpoint are related to a container network communication link across a container group Pod, the Pod is configured with a plurality of network endpoints to support container communication across Pod; search for a target access action corresponding to the identity information of the first network endpoint and the identity information of the second network endpoint based on a network endpoint-level access control list pre-configured for the Pod, where the network endpoint-level access control list is used to maintain an access action for network ingress and egress between network endpoints across Pod, and the access action includes allowing access or denying access; and perform the target access action.

The computer program codes used to perform the operations of the present disclosure may be written in one or more programming languages or a combination thereof. The above programming languages include object-oriented programming languages such as Java, Smalltalk, and C++, and may also include conventional procedural programming languages such as C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or the connection may be made to an external computer (for example, through the Internet using an Internet service provider).

The flowcharts and block diagrams in the drawings illustrate the architecture, functionality, and operation of possible implementations of systems, methods, and computer program products according to various embodiments of the present disclosure. In this regard, each block in the flowcharts or block diagrams may represent a module, a program segment, or a part of codes, the module, the program segment, or the part of codes includes one or more executable instructions for implementing specified logical functions. It should also be noted that, in some alternative implementations, the functions labeled in the blocks may also occur in a different order than the order noted in the drawings. For example, two blocks shown in succession may, in fact, can be executed substantially concurrently, or may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules involved in the embodiments described in the present disclosure may be implemented in software or hardware. Among them, the name of the module does not constitute a limitation on the module itself under certain circumstances.

The functions described above herein may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, a machine-readable medium may be a tangible medium that may include or store a program for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection with one or more wires, a portable computer disk, a hard disk, a random access memory (RAM), a read-only memory (ROM), an erasable programmable read-only memory (EPROM) or flash memory, an optical fiber, a portable compact disc read-only memory (CD-ROM), an optical storage device, a magnetic storage device, or any suitable combination of the above.

The above description is only preferred embodiments of the present disclosure and an illustration of the applied technical principles. Those skilled in the art should understand that the disclosure scope involved in the present disclosure is not limited to the technical solutions formed by the specific combination of the above technical features, and should also cover other technical solutions formed by any combination of the above technical features or their equivalent features without departing from the above disclosed concept, for example, a technical solution formed by replacing the above features with other technical features with similar functions disclosed in the present disclosure (but not limited to).

In addition, although operations are depicted in a particular order, this should not be understood as requiring that such operations are performed in a specific order shown or in a sequential order. Under certain circumstances, multitasking and parallel processing may be advantageous. Likewise, although the above discussion comprises several specific implementation details, these should not be interpreted as limiting the scope of the present disclosure. Certain features that are described in the context of separate embodiments may also be implemented in combination in a single embodiment. Conversely, various features that are described in the context of a single embodiment may also be implemented in multiple embodiments individually or in any suitable sub-combination.

Although the subject matter has been described in language specific to structural features and/or method logical actions, it should be understood that the subject matter defined in the appended claims is not necessarily limited to the specific features or actions described above. Rather, the specific features and actions described above are merely example forms for implementing the claims. Regarding the apparatus in the above embodiments, the specific manner in which each module performs operations has been described in detail in the embodiments related to the method, and will not be described in detail here.

The invention claimed is:

1. A container network access control method, comprising:

determining, by a filter, identity information of a first network endpoint and identity information of a second network endpoint, wherein the first network endpoint and the second network endpoint are related to a container network communication link across a container group (Pod), the Pod is configured with a plurality of network endpoints to support container communication across Pod;

searching for a target access action corresponding to the identity information of the first network endpoint and the identity information of the second network endpoint based on a network endpoint-level access control list preconfigured for the Pod, wherein the network endpoint-level access control list is used to maintain an access action for network ingress and egress between network endpoints across Pod, and the access action comprises allowing access or denying access; and performing the target access action.

2. The method according to claim 1, wherein the plurality of network endpoints configured by the Pod support a plurality of network protocols, and the plurality of network protocols at least comprise a Transmission Control Protocol/Internet Protocol (TCP/IP) protocol and a Remote Direct Memory Access (RDMA) protocol.

3. The method according to claim 2, wherein the determining, by a filter, identity information of a first network endpoint and identity information of a second network endpoint comprises:

acquiring, by an extended Berkeley packet filter (eBPF) hooked on the first network endpoint of the Pod, a data packet of a TCP/IP protocol stack via the first network endpoint, and parsing the data packet to determine the identity information of the first network endpoint and the identity information of the second network endpoint.

4. The method according to claim 2, wherein the determining, by a filter, identity information of a first network endpoint and identity information of a second network endpoint comprises:

acquiring the identity information of the first network endpoint and the identity information of the second network endpoint by an extended Berkeley packet filter (eBPF) hooked on a system kernel probe, wherein the first network endpoint and the second network endpoint communicate using the RDMA protocol.

5. The method according to claim 2, wherein the searching for a target access action corresponding to the identity information of the first network endpoint and the identity information of the second network endpoint based on a network endpoint-level access control list preconfigured for the Pod comprises:

in response to the first network endpoint and the second network endpoint using an RDMA protocol, determining a first network endpoint group to which the first network endpoint belongs and a second network endpoint group to which the second network endpoint belongs according to the identity information of the first network endpoint and the identity information of the second network endpoint;

searching for, in the network endpoint-level access control list, an access control rule that allows the first network endpoint group and the second network endpoint group to communicate according to the first network endpoint group and the second network endpoint group; and determining the target access action to be the allowing access in response to finding the access control rule, and determining the target access action to be the denying access in response to not finding the access control rule.

6. The method according to claim 1, further comprising:

delivering and storing the network endpoint-level access control list in a mapping table of the filter in advance, wherein the network endpoint-level access control list is generated by a container orchestration system for network endpoint configuration of the Pod.

7. The method according to claim 6, further comprising:

configuring configuration information according to a network protocol supported by a network endpoint in the Pod through a custom resource provided by the container orchestration system in combination with an access control list configuration template, wherein the configuration information comprises an access control rule and a network endpoint specified to apply the access control rule, and the access control list configuration template is used to provide a plurality of groups of parameters to configure the access control rule for the network endpoint; and generating the network endpoint-level access control list according to the configuration information.

8. The method according to claim 1, wherein the performing the target access action comprises:

performing the target access action based on a network protocol of the first network endpoint and a network protocol of the second network endpoint.

9. The method according to claim 8, wherein the performing the target access action based on a network protocol of the first network endpoint and a network protocol of the second network endpoint comprises:

in response to the first network endpoint and the second network endpoint using an RDMA protocol, performing the target access action to allow or interrupt the first network endpoint and the second network endpoint to establish a communication connection; and in response to the first network endpoint and the second network endpoint using a TCP/IP protocol, performing the target access action to allow to transmit a TCP/IP data packet through the first network endpoint or to discard the TCP/IP data packet.

10. The method according to claim 1, wherein the searching for a target access action corresponding to the identity information of the first network endpoint and the identity information of the second network endpoint based on a network endpoint-level access control list preconfigured for the Pod comprises:

in response to the first network endpoint and the second network endpoint using an RDMA protocol, determining a first network endpoint group to which the first network endpoint belongs and a second network endpoint group to which the second network endpoint belongs according to the identity information of the first network endpoint and the identity information of the second network endpoint;

searching for, in the network endpoint-level access control list, an access control rule that allows the first network endpoint group and the second network endpoint group to communicate according to the first network endpoint group and the second network endpoint group; and determining the target access action to be the allowing access in response to finding the access control rule, and determining the target access action to be the denying access in response to not finding the access control rule.

11. A non-transitory computer-readable medium having a computer program stored thereon, wherein the computer program, when executed by a processing apparatus, implements a container network access control method, and the method comprises:

determining, by a filter, identity information of a first network endpoint and identity information of a second network endpoint, wherein the first network endpoint and the second network endpoint are related to a container network communication link across a container group (Pod), the Pod is configured with a plurality of network endpoints to support container communication across Pod;

searching for a target access action corresponding to the identity information of the first network endpoint and the identity information of the second network endpoint based on a network endpoint-level access control list preconfigured for the Pod, wherein the network endpoint-level access control list is used to maintain an access action for network ingress and egress between network endpoints across Pod, and the access action comprises allowing access or denying access; and performing the target access action.

12. An electronic device, comprising:

a storage apparatus having a computer program stored thereon; and a processing apparatus, configured to execute the computer program in the storage apparatus to implement a container network access control method, and the method comprises:

determining, by a filter, identity information of a first network endpoint and identity information of a second network endpoint, wherein the first network endpoint and the second network endpoint are related to a container network communication link across a container group (Pod), the Pod is configured with a plurality of network endpoints to support container communication across Pod;

searching for a target access action corresponding to the identity information of the first network endpoint and the identity information of the second network endpoint based on a network endpoint-level access control list preconfigured for the Pod, wherein the network endpoint-level access control list is used to maintain an access action for network ingress and egress between network endpoints across Pod, and the access action comprises allowing access or denying access; and performing the target access action.

13. The electronic device according to claim 12, wherein the plurality of network endpoints configured by the Pod support a plurality of network protocols, and the plurality of network protocols at least comprise a Transmission Control Protocol/Internet Protocol (TCP/IP) protocol and a Remote Direct Memory Access (RDMA) protocol.

14. The electronic device according to claim 13, wherein when performing the determining, by a filter, identity information of a first network endpoint and identity information of a second network endpoint, the processing apparatus is configured to:

acquire, by an extended Berkeley packet filter (eBPF) hooked on the first network endpoint of the Pod, a data packet of a TCP/IP protocol stack via the first network endpoint, and parse the data packet to determine the identity information of the first network endpoint and the identity information of the second network endpoint.

15. The electronic device according to claim 13, wherein when performing the determining, by a filter, identity information of a first network endpoint and identity information of a second network endpoint, the processing apparatus is configured to:

acquire the identity information of the first network endpoint and the identity information of the second network endpoint by an extended Berkeley packet filter (eBPF) hooked on a system kernel probe, wherein the first network endpoint and the second network endpoint communicate using the RDMA protocol.

16. The electronic device according to claim 12, wherein the method further comprises:

delivering and storing the network endpoint-level access control list in a mapping table of the filter in advance, wherein the network endpoint-level access control list is generated by a container orchestration system for network endpoint configuration of the Pod.

17. The electronic device according to claim 16, wherein the method further comprises:

configuring configuration information according to a network protocol supported by a network endpoint in the Pod through a custom resource provided by the container orchestration system in combination with an access control list configuration template, wherein the configuration information comprises an access control rule and a network endpoint specified to apply the access control rule, and the access control list configuration template is used to provide a plurality of groups of parameters to configure the access control rule for the network endpoint; and generating the network endpoint-level access control list according to the configuration information.

18. The electronic device according to claim 12, wherein when performing the performing the target access action, the processing apparatus is configured to:

perform the target access action based on a network protocol of the first network endpoint and a network protocol of the second network endpoint.

19. The electronic device according to claim 18, wherein when performing the performing the target access action based on a network protocol of the first network endpoint and a network protocol of the second network endpoint, the processing apparatus is configured to:

in response to the first network endpoint and the second network endpoint using an RDMA protocol, perform the target access action to allow or interrupt the first network endpoint and the second network endpoint to establish a communication connection; and in response to the first network endpoint and the second network endpoint using a TCP/IP protocol, perform the target access action to allow to transmit a TCP/IP data packet through the first network endpoint or to discard the TCP/IP data packet.

20. The electronic device according to claim 12, wherein when performing the searching for a target access action corresponding to the identity information of the first network endpoint and the identity information of the second network endpoint based on a network endpoint-level access control list preconfigured for the Pod, the processing apparatus is configured to:

in response to the first network endpoint and the second network endpoint using an RDMA protocol, determine a first network endpoint group to which the first network endpoint belongs and a second network endpoint group to which the second network endpoint belongs according to the identity information of the first network endpoint and the identity information of the second network endpoint;

search for, in the network endpoint-level access control list, an access control rule that allows the first network endpoint group and the second network endpoint group to communicate according to the first network endpoint group and the second network endpoint group; and determine the target access action to be the allowing access in response to finding the access control rule, and determine the target access action to be the denying access in response to not finding the access control rule.

* * * * *